(12) United States Patent
Johnson et al.

(10) Patent No.: US 8,117,175 B1
(45) Date of Patent: Feb. 14, 2012

(54) METHODS AND APPARATUS FOR QUERYING MULTIPLE DATA STREAMS

(75) Inventors: Theodore Johnson, New York, NY (US); Oliver Spatscheck, Randolph, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 211 days.

(21) Appl. No.: 11/291,198

(22) Filed: Nov. 30, 2005

(51) Int. Cl.
*G06F 7/00* (2006.01)
*G06F 17/30* (2006.01)
(52) U.S. Cl. ......... 707/705; 707/708; 707/721; 707/727
(58) Field of Classification Search ................. 370/458, 370/376, 395.1, 357; 715/733, 734, 736; 709/459, 460; 707/705, 708, 721, 727, 759, 707/765, 999.002, 999.003, 999.005
See application file for complete search history.

(56) References Cited

U.S. PATENT DOCUMENTS

| | | | |
|---|---|---|---|
| 6,021,263 A * | 2/2000 | Kujoory et al. | 709/232 |
| 6,195,647 B1 * | 2/2001 | Martyn et al. | 705/35 |
| 6,415,313 B1 * | 7/2002 | Yamada et al. | 709/200 |
| 6,570,867 B1 * | 5/2003 | Robinson et al. | 370/351 |
| 6,691,106 B1 * | 2/2004 | Sathyanarayan | 717/174 |
| 6,792,393 B1 * | 9/2004 | Farel et al. | 702/186 |
| 6,931,416 B2 * | 8/2005 | Kelley et al. | 707/102 |
| 7,107,549 B2 * | 9/2006 | Deaton et al. | 707/E17.111 |
| 7,342,897 B1 * | 3/2008 | Nader et al. | 709/203 |
| 7,502,774 B2 * | 3/2009 | Beavers et al. | 707/2 |
| 2002/0031094 A1 * | 3/2002 | Nitta | 370/252 |
| 2002/0184373 A1 * | 12/2002 | Maes | 709/228 |
| 2004/0085346 A1 * | 5/2004 | Subramanian et al. | 345/735 |
| 2004/0095955 A1 * | 5/2004 | Subramanian et al. | 370/458 |

* cited by examiner

*Primary Examiner* — Vincent Boccio

(57) ABSTRACT

A method and apparatus for querying multiple streams of data traffic are disclosed. In one embodiment, the method specifies interfaces or data sources in accordance with their properties. In turn, the method then accepts a query for querying multiple data streams and automatically constructs a set of queries in accordance with at least one specified property, where the set of queries is to be applied over the multiple data streams.

17 Claims, 4 Drawing Sheets

METHODS AND APPARATUS FOR QUERYING MULTIPLE DATA STREAMS

The present invention relates generally to communication networks and, more particularly, to a method and apparatus for querying multiple streams of traffic in data stream sources such as networks, e.g., VoIP and SoIP networks.

BACKGROUND OF THE INVENTION

The Internet has emerged as a critical communication infrastructure, carrying traffic for a wide range of important scientific, business and consumer applications. Since Internet services are becoming ubiquitous, more and more businesses and consumers are relying on their Internet connections for both voice and data transport needs. Each component of the network is shared by a large number of businesses and consumers and needs to meet a variety of service quality expectations. Network service providers and enterprise network operators need to monitor the performance of the network and make changes in order to retain the high quality of service. For example, monitoring of delay for packets traversing the network provides information that could be used to determine where improvement in routing or capacity is needed.

The network management functions such as root-cause analysis rely on gathering network performance data. The network traffic and the network performance data arrive at a high data rate and require significant data reduction and analysis prior to being utilized for action. For example, network performance monitoring devices may measure TCP handshake times, roundtrip delay times, etc. and store the data for analysis and action. For example, the data might be used to search for virus signatures and trigger alarms and initiate mitigating steps. Data stream analysis techniques have been developed to make a single pass over the data, process the data stream, compute and store the results. The techniques have been used to automate and optimize the data stream processing for a single data stream by relying on a specific query from the user. Therefore, the performance monitoring devices may be monitoring traffic from a variety of sources such as different Internet Service Providers (ISP), different speeds and types of traffic, etc. However, the data stream processing requires a specific query for each stream from the network manager in a query language such as Standard Query Language (SQL).

Therefore, there is a need for a method that enables queries to be applied over multiple data streams.

SUMMARY OF THE INVENTION

In one embodiment, the present invention discloses a method and apparatus for querying multiple streams of traffic by automating the tasks of writing queries over multiple interfaces. For example, the method specifies interfaces and their properties, mechanizes the process of referencing interface set queries within data stream queries and mechanizes the process of returning a set of interfaces based on predicates over interface properties. The method then accepts data stream queries and automatically constructs the queries to be applied over the multiple data streams using the process for referencing interface set queries from data stream queries and interface properties. The method evaluates the data the resulting queries over the multiple data streams and provides the result to the user.

Therefore, the present method automates the task of issuing queries over multiple interfaces and eliminates or reduces the amount of resources needed to issue queries and gather responses. The elimination of the specific steps for each data stream also reduces errors in writing and maintaining queries.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for querying multiple streams of traffic in a network such as Voice over Internet Protocol (VoIP) or Service over Internet Protocol (SoIP). Although the present invention is discussed below in the context of IP network, the present invention is not so limited. Namely, the present invention can be applied for any type of data stream monitoring such as monitoring of financial market data sources, sources of clicks on a web site, etc. The network monitoring data can be for any type of network such as the circuit switched network, cellular network, etc. that uses protocols to exchange packets or records for any service.

Figure 1:
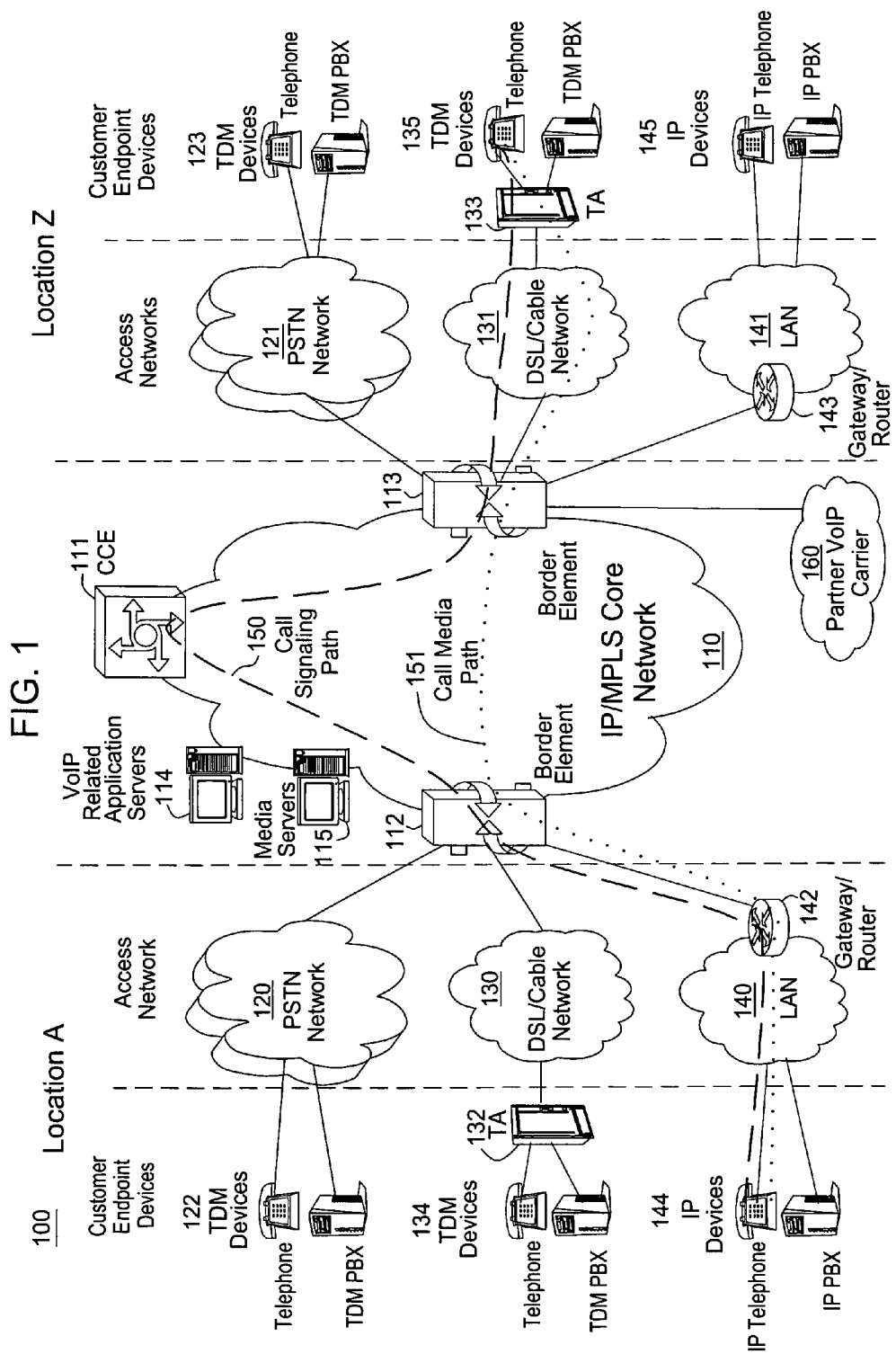
FIG. 1 illustrates an exemplary network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup-signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call, CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the called party accepts the call at location Z, a call acknowledgement signaling message, such as a SIP 200 OK response message if SIP is used, is sent in the reverse direction back to the CCE 111. After the CCE 111 receives the call acknowledgment message, it will then send a call acknowledgement-signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above VoIP network is described to provide an illustrative environment in which multiple streams of data are transmitted. Network service providers and enterprise network operators need to monitor the performance of the network and make changes in order to retain the high quality of service. For example, monitoring of delay for packets traversing the network provides information that could be used to determine where improvement in routing or capacity is needed. However, data stream processing often requires a specific query for a single stream from the network manager in a query language such as Standard Query Language (SQL).

However, there are certain situations where a plurality of streams may need to be monitored, e.g., monitoring data from a plurality of data stream sources such as network links. In fact, multiple data stream monitoring is also necessary for other applications such as monitoring of data in financial markets, sources for clicks on a web site, etc. For example, financial data requests from various brokerage firms, banks, etc. can also be monitored.

Therefore, there is a need for a method that enables queries to be applied over multiple data streams. In one embodiment, the present invention provides a method and apparatus for querying multiple streams of traffic by automating the tasks of writing queries over multiple interfaces. The method specifies interfaces and their properties, mechanizes the process of referencing interface set queries within data stream queries and mechanizes the process of returning a set of interfaces based on predicates over interface properties. The method then accepts data stream queries and automatically constructs the queries to be applied over the multiple data streams using the process for referencing interface set queries from data stream queries and interface properties. The method then evaluates the data the resulting queries over the multiple data streams and provides the result to the user.

Therefore, the present method automates the task of issuing queries over multiple interfaces and eliminates or reduces the amount of resources needed to issue queries and gather responses. The elimination of the specific steps for each data stream also reduces errors in writing and maintaining queries.

In order to clearly illustrate the present invention, the following database and data stream monitoring concepts will first be described. These concepts are that of:

A Data Base Management System (DBMS);
A query language;
A data stream; and
A Data Stream Management System (DSMS).

A Data Base Management System (DBMS) is a system used to enable the user to store, manage and retrieve information to and/or from a database. The database management system is typically a computer program however it could contain hardware and firmware components. The requests for information from a database must be understood by the database management system. Thus, the requests are made using a query language as defined below.

A query language refers to a set of rules or syntaxes for constructing queries. In one embodiment, a query is then a request for information submitted to a database management system using a specific syntax. The database management system may support a list of query languages such as Structured Query Language (SQL), Fourth Generation Language (4GL), etc. The database management system may also present the responses to the queries in a variety of formats such as graphs, charts, ASCII files, reports, etc.

A data stream refers to a flow of data for an indefinite period of time. Thus, unlike a database that contains a finite stored data, a data stream has indefinite length and it is not stored in a memory. Therefore, it is not possible to read an entire data stream.

A Data Stream Management System (DSMS) refers to a system for processing data streams, e.g., to retrieve information from a data stream. A DSMS has a method by which it bounds portions of the data stream that may affect the output. Therefore, a DSMS is not required to read the data in its entirety to produce outputs. For example, a DSMS can use temporal properties such as a specific time interval to determine the bounds on the input data stream. For example, the user can determine the number of packets for a specific time interval on a data stream.

Monitoring devices can monitor multiple data streams from a variety of data sources. For example, a network packet monitoring system can monitor packet data from multiple ports located on one or more network elements. When the user issues queries for multiple data streams, the DSMS collects the desired input streams from the various sources, merges the inputs in a way that preserves the properties, and then runs the query on the merged input stream. For example, if the user requests for the volume of traffic on two packet streams for a given time interval, the DSMS collects the applicable input streams for the specific time interval for both streams, merges the input streams while preserving the time properties, runs the query to determine the volume of traffic and then provides the response to the user. Therefore, one can manually specify the multiple data streams for applying and evaluating the query. However, the above query method for multiple streams requires the user to provide a query for each source of data stream. The query becomes difficult to maintain as data stream sources are added and deleted. For example, the user must maintain a complete and updated list of all possible data sources. The query language is also long and complicated and may require manual coding by the user. For example, if the user desired to determine the volume of traffic from all ports on a router and the user knew only about one of the ports used on the router, the query issues by the user would specify only one port and the request would be evaluated only for that port. Hence, the list of sources for the data streams has to be completely accurate for the data to be useful. Therefore, there is a need for a method that enables the user to easily query multiple data streams without having to access a specific list of data stream sources and/or to use a complex query language.

The current invention enables the user to automate the task of writing queries over multiple data stream sources, reduces the burden on the user, reduces the errors in writing and maintaining queries, and enhances the ability of the DSMS to optimize the queries. In one embodiment, the method of the current invention defines a language for expressing data stream sources and their properties, and define a query language that returns a set of data stream sources based on predicates over properties of the data stream sources. The method then enables the DSMS to reference a set of data stream sources in a data stream query. Therefore, the method enables the DSMS to automatically construct the queries to be evaluated over the multiple data streams by utilizing the fact that the data stream query received from the user represents a query over multiple interfaces.

In one embodiment, the present method also enables the user to provide the properties of the data stream sources as part of the query and receive a response from the DSMS based on evaluation of the query over all the data stream sources with the provided properties. For example, if a network element has two Ethernet ports and the user requests for volume of packets for Ethernet ports, the DSMS first determines which ports are being used for Ethernet, evaluates the request over both ports and provides a response to the user. If there were no Ethernet ports, the user would receive a response that would specify zero packets for Ethernet ports. If at some future time more ports were used for Ethernet traffic, the query issued by the user would be the same without the need for constructing a new query. The evaluation would include the added ports and the response would be based on all Ethernet ports at the time of the request.

In one embodiment, the current method represents each data source of a data stream by a set of properties. Some properties need to be specified for each source but others are optional. For example, for a network monitoring application involving interfaces on servers, the name and the host server used to identify the interface are required properties. Other properties that describe the interface are optional and may be repeated. For example, if the interface is used for incoming traffic, the optional property could specify "incoming". If it is used for a specific rate of transmission or medium such as wireless, copper, fiber optic connection, etc. the optional properties can be provided. The service provider may determine the set of required and optional properties to be used for defining the interfaces. Some examples of properties are: a name of the data source, a server name or identifier, a direction of data transmission such as in, out, bi-directional, a type of the interface such as Ethernet, a type of data traffic, a rate of transmission, a medium of transmission such as wired or wireless, etc. In the above exemplary network monitoring application, the server at which they are located is use to group the interfaces. Thus, the server and the name of the data source serve as the address of the interface, thereby causing these two properties to be considered required properties. The other properties can be considered optional.

For monitoring of data streams for other applications, the properties are defined similarly based on the application. For example, for financial markets data stream monitoring application, the properties may be related to the particular financial institution, particular server or portion of data network, type of data such as transaction processing, data backup, data storage, user authentication, etc. Regardless of the industry or the application, the data stream sources are defined based on properties.

The method then defines a query language that returns a set of data stream sources based on predicates over properties of the data stream sources and a method for referencing a set of data stream sources in a data stream query. Hence, when the user issues a data stream query to the DSMS, the query is evaluated over all data stream sources that match the data stream source expressions. In one embodiment, the user can issue the properties of a data stream query and the DSMS evaluates the query over all data stream sources with the specified properties. For example, if the user issues a query to be evaluated on data stream sources used for wireless communication, then the DSMS determines which sources have wireless communication as a property and then evaluates the query over the data stream sources that match the specified property or properties. Therefore, the user is not required to provide a specific list of data stream sources, a number of sources, and so on.

The present invention also provides a method for merging the results of the evaluation of the data stream query over multiple data stream sources. For example, the results can be merged as the union of all results, sequenced by arrival time, grouped by source type, etc. The method then proceeds to express all data stream sources using the defined language and properties, to receive data stream queries, and to process the queries.

Figure 2:
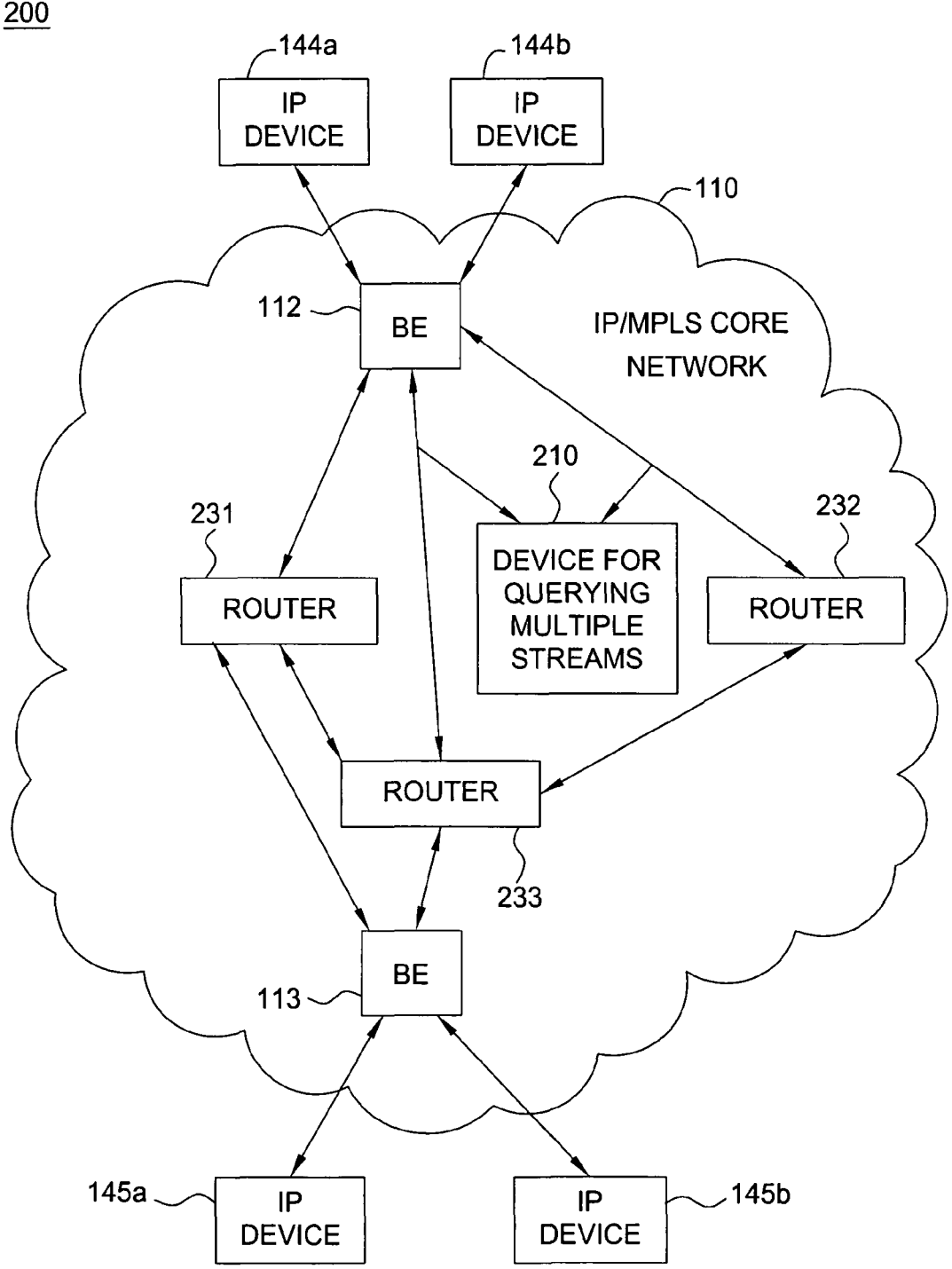
FIG. 2 illustrates an example of a network with the invention for querying multiple streams of data.

FIG. 2 illustrates an example of a network 200 with the present invention for querying multiple streams of data traffic. For example, the customers are using the plurality of IP devices 144a and 144b to access the IP services such as VoIP and SoIP services. IP devices 144a and 144b are connected to the Border Element (BE) 112 located on the IP/MPLS core network 110. The routers 231, 232 and 233 are part of the IP/MPLS core network 110 and are used to route packets to the plurality of IP devices 145a and 145b. The packets traverse the core network from BE 112 to BE 113. The packets are then sent to the IP devices 145a and 145b connected to the border element 113. Note that only the network elements used to describe the invention are illustrated in FIG. 2. In one embodiment, the service provider of the network 110 has implemented the present invention for monitoring and managing multiple data streams in monitoring system or device 210. For example, the device is monitoring the traffic on a network link between the border element 112 and the router 233 and the traffic on another network link between the border element 112 and the router 232. The device 210 is passively monitoring the traffic but does not modify the data. For example, the device does not perform any correction of transmission errors. The device is capable of performing a plurality of different functions including but not limited to: receiving data stream queries from the users, determining the data stream sources that match the queries, constructing the queries to be evaluated over each identified data stream source, running the queries, passively gathering data, merging the results and providing the results to the users that issued the data stream queries. Hence, the device 210 performs the monitoring of the multiple data streams and interacts with the users to receive queries and to provide responses.

Figure 3:
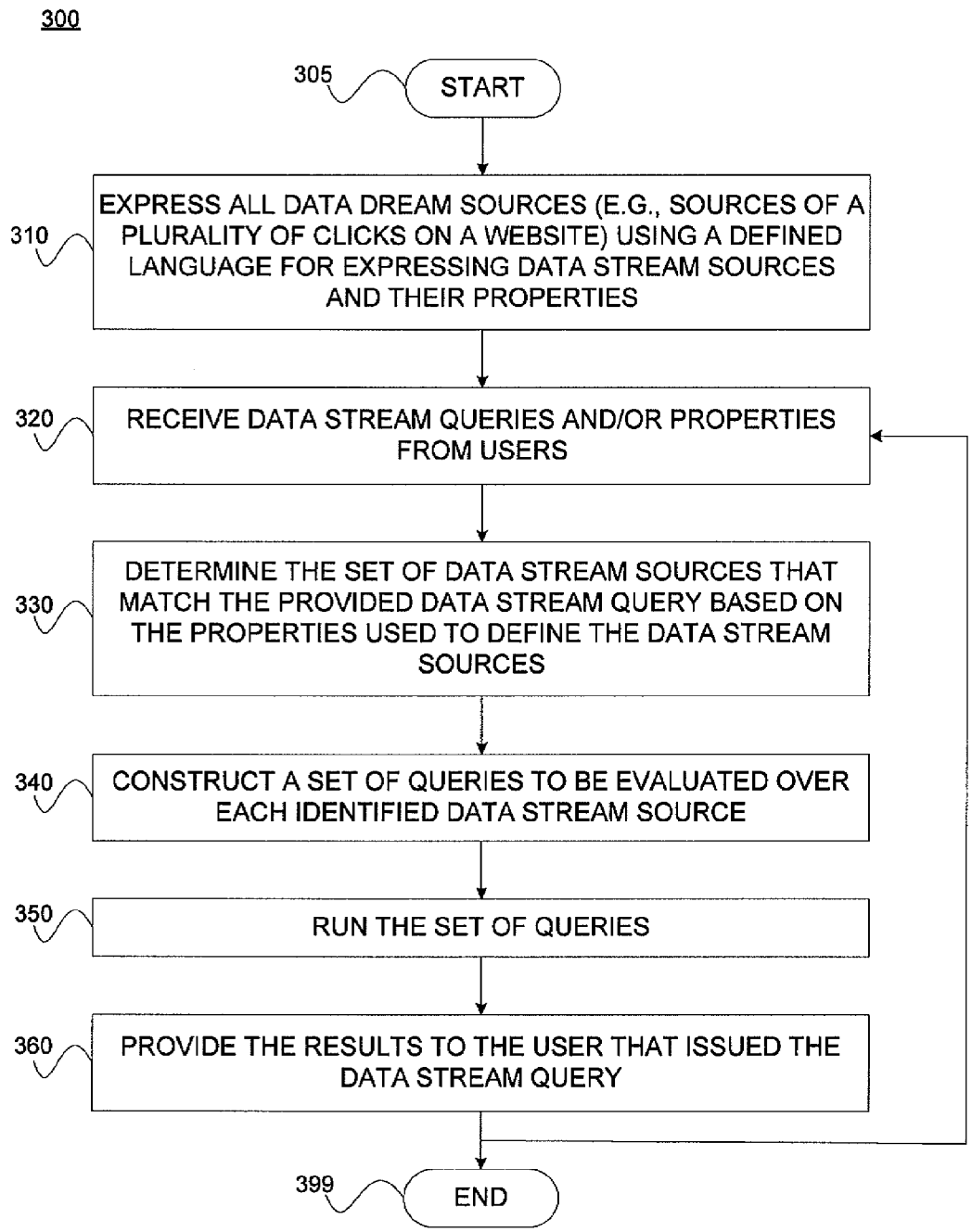
FIG. 3 illustrates a flowchart of a method for querying multiple streams of data.

FIG. 3 illustrates a flowchart of an exemplary method 300 for querying multiple streams of data traffic. For example, a service provider of a communication network may employ the present invention to monitor data on a plurality of network links of the communication network. First, the data stream sources are represented by a set of properties. The method then defines a query language that returns a set of data stream sources based on predicates over properties of the data stream sources. It also defines a method for referencing a set of data stream sources in a data stream query. Hence, when the user issues a data stream query to the DSMS, the query is evaluated over all data stream sources that match the provided data stream source expressions. In one embodiment, the method enables the user to issue the properties of a data stream query and the DSMS will then evaluate the query over all data stream sources with the specified properties, thereby eliminating the need to provide a specific list of data stream sources to the DSMS. The present invention may also provide a method for merging the results of the evaluation of the data stream query over multiple data stream sources. For example, the results can be merged as the union of all results, sequenced by arrival time, grouped by source type, etc.

Method 300 starts in step 305 and proceeds to step 310. In step 310, method 300 expresses all data stream sources using a defined language for expressing data streams and their properties. For example, an interface on a router being monitored as a data stream source may have a syntax that includes a source name (e.g., a router name or router number), a direction of transmission, a type of traffic, a data transmission rate, etc. Exemplary expressions may then comprise "Name=Router numbers1-10", "Interface Type=Ethernet", "Direction=out", "Rate of Transmission=Low" and so on.

In step 320, method 300 receives a single data stream query from a user for querying a plurality of data streams from a plurality of data sources, i.e., a query for querying multiple data streams. When a user issues a data stream query to the DSMS, the query is automatically evaluated over all data stream sources that match the data stream source expressions. In one embodiment, the method also receives properties of the data stream sources. The method can then use the properties to determine which data stream sources are relevant for evaluating the query. For example, if a network element has two Ethernet ports and the user needs to determine the volume of traffic to be evaluated over both Ethernet ports, the user may issue a query with Ethernet expressed as a property of the desired ports. Hence, the DSMS first needs to determine which ports have Ethernet as a property before proceeding to evaluate the request and to provide a response to the user. If there were no Ethernet ports, the user would receive a response that would specify zero packets for Ethernet ports. If at some future time more ports were used for Ethernet traffic, the query issued by the user would be the same without having to craft a new and unique query tailored to the new Ethernet ports. The evaluation would include the added ports and the response would be based on all Ethernet ports at the time of the request.

In step 330, method 300 determines the data stream sources that match the queries based on the properties used to define the data stream source. For the example above, the method would identify all the data streams with Ethernet provided as a property. It then proceeds to step 340 to construct a set of queries to be used for a plurality of identified data stream sources.

In step 340, method 300 constructs the set of queries to be evaluated over the plurality of identified data stream sources. For the example above with two Ethernet ports, the set of queries would contain two queries, where a first query is specifically constructed for use with a first Ethernet port, whereas a second query is specifically constructed for use with a second Ethernet port. If no port was identified as an Ethernet port, the method will not generate any queries. Thus, the user does not have to individually generate a plurality of queries. Instead, method 300 will interpret the user's query and based upon the number of detected data sources that matched the properties as specified, the method 300 will automatically generate a pertinent set of queries. Thus, the user will receive the responses based on the evaluation of all the queries that are constructed in step 340.

To illustrate, an interface property is used in a user's query as illustrated below in column 1 of Table 1. The method then determines the various data sources that matched the properties and generates the four queries illustrated in column 2 of Table 1.

TABLE 1

| User's Query | Equivalent Queries |
|---|---|
| Query Dir_internal:<br>Select Time, $Dir as dir, sum (Length)<br>From [Internal] . pkts<br>Group by Time | Query Dir_input_0:<br>Select Time, 'in' as dir, Length<br>From Eth0 . pckts<br>Query Dir_input_1:<br>Select Time, 'out' as dir, Length<br>From Eth1 . pckts<br>Query Dir_input:<br>Merge LBS_input_0, LBS_input_1<br>On Time<br>Query Dir_explicit:<br>Select Time, dir, sum (Length)<br>From LBS_input<br>Group by Time |

Those skilled in the art would realize that there are various methods of implementation of the present invention. As such, the present invention is not limited to the particular syntax as shown in the above example in Table 1.

In step 350, method 300 runs the queries. In one embodiment, method 300 will also gather the data and merge the results according to the method established in the DSMS for merging results. For the above example with two Ethernet ports, if the user wanted to capture packet loss data for the Ethernet ports. The queries are constructed and data is gathered for both ports. The merging method may simply perform a union of the two results. If one port had one packet lost and the second had ten packets lost, then the merged result will indicate eleven packets lost in the specific duration.

In step 360, method 300 provides the results to the users that issued the data stream queries. For the network example above, the user that issued the request to determine the packet loss data for the Ethernet ports would receive the fact that eleven packets were lost. The method then proceeds to step 320 to continue receiving data stream queries or to step 399 to end processing the current query.

Figure 4:
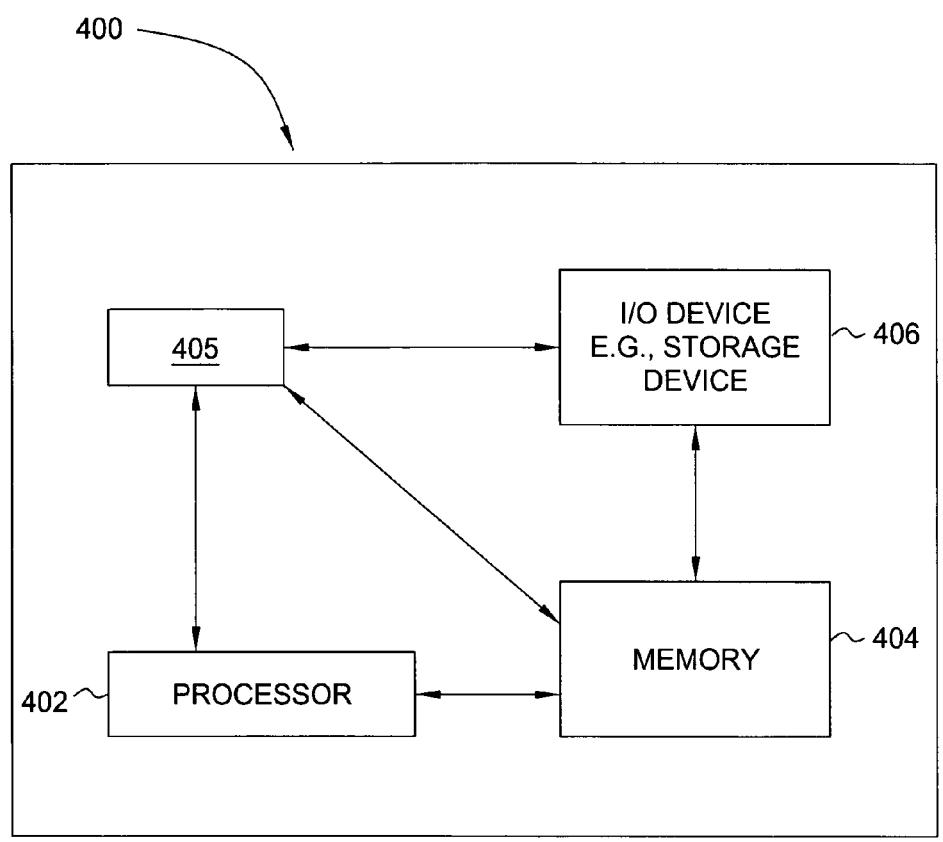
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for querying multiple streams of data traffic, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for querying multiple streams of data traffic can be loaded into memory 404 and executed by processor 402 to implement the functions as discussed above. As such, the present method 405 for querying multiple streams of data traffic (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for querying data stream sources, comprising:
receiving a single user query for querying multiple data streams, where the single user query specifies a property, wherein the property comprises a data transmission property;
after the receiving, determining a plurality of data stream sources matching the property, wherein the plurality of data stream sources comprises a plurality of sources of clicks on a web site;
after the determining, automatically generating a set of queries based solely upon the property specified by the single user query, wherein each one of the set of queries is a different type of query corresponding to a respective one of the plurality of data stream sources; and
executing the set of queries over the plurality of data stream sources.

2. The method of claim 1, wherein the plurality of data stream sources comprises a plurality of network links in a communication network.

3. The method of claim 2, wherein the communication network is an internet protocol network.

4. The method of claim 1, further comprising:
representing each of the plurality of data stream sources in accordance with a set of properties.

5. The method of claim 1, wherein the single user query for querying multiple data streams is formulated in accordance with a query language that returns a set of data stream sources based on a property of the set of data stream sources.

6. The method of claim 1, further comprising:
merging results of the set of queries over the plurality of data stream sources.

7. A computer-readable medium having stored thereon a plurality of instructions, the plurality of instructions including instructions which, when executed by a processor, cause the processor to perform a method for querying data stream sources, comprising:
receiving a single user query for querying multiple data streams, where the single user query specifies a property, wherein the property comprises a data transmission property;
after the receiving, determining a plurality of data stream sources matching the property, wherein the plurality of data stream sources comprises a plurality of sources of clicks on a web site;
after the determining, automatically generating a set of queries based solely upon the property specified by the single user query, wherein each one of the set of queries is a different type of query corresponding to a respective one of the plurality of data stream sources; and
executing the set of queries over the plurality of data stream sources.

8. The computer-readable medium of claim 7, wherein the plurality of data stream sources comprises a plurality of network links in a communication network.

9. The computer-readable medium of claim 8, wherein the communication network is an internet protocol network.

10. The computer-readable medium of claim 7, further comprising:
representing each of the plurality of data stream sources in accordance with a set of properties.

11. The computer-readable medium of claim 7, wherein the single user query for querying multiple data streams is formulated in accordance with a query language that returns a set of data stream sources based on a property of the set of data stream sources.

12. The computer-readable medium of claim 7, further comprising:
merging results of the set of queries over the plurality of data stream sources.

13. An apparatus for querying data stream sources, comprising:
a processor configured to:
receive a single user query for querying multiple data streams, where the single user query specifies a property, wherein the property comprises a data transmission property;
determine, after the single user query is received, a plurality of data stream sources matching the property, wherein the plurality of data stream sources comprises a plurality of sources of clicks on a web site;
automatically generate, after the plurality of data stream sources is determined, a set of queries based solely upon the property specified by the single user query, wherein each one of the set of queries is a different type of query corresponding to a respective one of the plurality of data stream sources; and
execute the set of queries over the plurality of data stream sources.

14. The apparatus of claim 13, wherein the single user query for querying multiple data streams is formulated in accordance with a query language that returns a set of data stream sources based on a property of the set of data stream sources.

15. The method of claim 1, wherein the data transmission property comprises a type of data traffic.

16. The method of claim 1, wherein the data transmission property comprises a type of interface.

17. The method of claim 1, wherein the data transmission property comprises a direction of data transmission.

* * * * *